(12) United States Patent  
Kim

(10) Patent No.: US 9,783,052 B2
(45) Date of Patent: Oct. 10, 2017

(54) UNIFIED ELECTRONIC AUTOMATIC TRANSMISSION LEVER

(71) Applicant: Hyundai Motor Company, Seoul (KR)

(72) Inventor: Eun-Sik Kim, Kwangmyong-Shi (KR)

(73) Assignee: Hyundai Motor Company, Seoul (KR)

( * ) Notice: Subject to any disclaimer, the term of this patent is extended or adjusted under 35 U.S.C. 154(b) by 504 days.

(21) Appl. No.: 14/550,976

(22) Filed: Nov. 22, 2014

(65) Prior Publication Data

US 2015/0251534 A1   Sep. 10, 2015

(30) Foreign Application Priority Data

Mar. 4, 2014   (KR) ........................ 10-2014-0025442

(51) Int. Cl.
| | |
|---|---|
| *B60K 17/04* | (2006.01) |
| *B60K 17/12* | (2006.01) |
| *B60K 20/08* | (2006.01) |
| *F16H 59/02* | (2006.01) |
| *F16H 59/10* | (2006.01) |
| *F16H 59/12* | (2006.01) |
| *F16H 59/08* | (2006.01) |

(52) U.S. Cl.
CPC ......... *B60K 20/08* (2013.01); *F16H 59/0217* (2013.01); *F16H 59/0278* (2013.01); *F16H 59/08* (2013.01); *F16H 59/105* (2013.01); *F16H 59/12* (2013.01); *F16H 2059/081* (2013.01); *F16H 2059/082* (2013.01)

(58) Field of Classification Search
CPC ............... B60K 20/08; F16H 2059/081; F16H 2059/082; F16H 59/0217; F16H 59/0278; F16H 59/08; F16H 59/105; F16H 59/12
See application file for complete search history.

(56) References Cited

U.S. PATENT DOCUMENTS

| | | | |
|---|---|---|---|
| 2006/0183597 A1* | 8/2006 | Szymczak | ............... B60K 37/06 477/107 |
| 2009/0146798 A1* | 6/2009 | Gencyuz | ................. F16H 59/02 340/456 |

(Continued)

FOREIGN PATENT DOCUMENTS

| | | |
|---|---|---|
| JP | 05-229360 A | 9/1993 |
| JP | 2011-173458 A | 9/2011 |
| JP | 2012-066639 A | 4/2012 |

*Primary Examiner* — William Kelleher
*Assistant Examiner* — Jake Cook
(74) *Attorney, Agent, or Firm* — Morgan, Lewis & Bockius LLP

(57) ABSTRACT

A unified electronic shift lever may include a first selection unit installed on a dashboard of a vehicle, and on which various selectable options including a gear shift option of the vehicle are indicated, a second selection unit installed on an upper portion of the first selection unit, and on which sub-options of the various selectable options selected at the first selection unit are indicated, a display unit disposed on an upper portion of the second selection unit and displaying options selected at the first selection unit and the second selection unit, and a control unit disposed below the dashboard, identifying operations of the first selection unit and the second selection unit to control various types of options of the vehicle, and changing indication on the second selection unit and the display unit.

12 Claims, 5 Drawing Sheets

(56) References Cited

U.S. PATENT DOCUMENTS

2011/0025488 A1\* 2/2011 Leon ................. B60K 37/06
340/456
2011/0277578 A1\* 11/2011 McGuire ............ F16H 59/0278
74/473.3

\* cited by examiner

UNIFIED ELECTRONIC AUTOMATIC TRANSMISSION LEVER

CROSS-REFERENCE TO RELATED APPLICATIONS

The present application claims priority to Korean Patent Application No. 10-2014-25442, filed Mar. 4, 2014, the entire contents of which is incorporated herein for all purposes by this reference.

BACKGROUND OF THE INVENTION

Field of the Invention

The present invention relates to an electronic shift lever for a vehicle, and more particularly, to a unified electronic shift lever which implements a convenient manipulation and reduces production costs because the electronic shift lever including a first selection unit, a second selection unit, and a display unit simultaneously performs various functions in a vehicle as well as a gear shift function.

Description of Related Art

In general, a transmission is an apparatus that transmits power generated by an engine to drive wheels while changing rotational force and speed depending on a driving state of a vehicle, and is classified into a manual transmission and an automatic transmission.

A driver who drives the vehicle may manipulate a shift lever, which is mounted on a console surface at the periphery of a driver seat or mounted on a steering handle, so as to change a gear shift stage of the manual transmission or the automatic transmission to a desired gear shift stage.

The manual transmission is operated in a manner in which when the driver selects a gear, which is suitable for a driving state of the vehicle, using the shift lever, a movement desired by the driver is transmitted to the manual transmission through a cable or a rod. The automatic transmission is operated in a manner in which the driver drives an inhibitor switch through a cable by moving the shift lever so as to transmit a movement desired by the driver to the automatic transmission.

Particularly, recently, usage of an electronic shift lever, which substitutes a mechanical connection structure between the transmission and the shift lever with an electrical connection structure having an actuator and an ECU instead of a mechanical shift lever, is increased.

The electronic shift lever requires no mechanical cable connection structure unlike the mechanical shift lever, and needs to have a position sensor unit that converts the driver's intention of shifting gears into an electronic signal, but there are advantages in that the driver may efficiently and conveniently manipulate the shift lever.

As the type of electronic shift lever, there is a lever type electronic shift lever which is operated in a manner in which an electronic shift lever protruding from a console surface of the vehicle is manipulated forward and rearward, a dial type electronic shift lever in which a cylindrical electronic shift lever mounted on the console surface of the vehicle is manipulated by being rotated clockwise and counter-clockwise, a column type electronic shift lever in which an electronic shift lever mounted at a side of the steering handle of the vehicle is manipulated upward and downward, and a button type electronic shift lever in which a button on which gear shift stages of the vehicle are indicated is manipulated by being pressed.

A plurality of buttons, which may perform various functions such as an audio system, a heater, and an electric parking brake (EPB), are disposed on a dashboard of the vehicle so as to assist the convenience in driving the vehicle.

However, the electronic shift lever and the plurality of buttons occupy a large layout in the vehicle, and are disposed to be spaced apart from each other over a large area, and as a result, there is a problem in that it is very difficult for the driver to manipulate the electronic shift lever and the plurality of buttons at one time.

The plurality of buttons is complicatedly spaced out, and as a result, there are problems in that it is difficult for the driver to identify the options performed by the respective buttons at one time, and the interior of the vehicle becomes complicated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a unified electronic shift lever in which buttons for changing gear shift stages in the vehicle and performing various functions are disposed in a single unified shift lever including a first selection unit and a second selection unit, thereby reducing production costs, remarkably improving a layout of the vehicle, and improving operational characteristics.

According to various aspects of the present invention, a unified electronic shift lever apparatus may include a first selection unit installed on a dashboard of a vehicle, and on which various selectable options including a gear shift option of the vehicle are indicated, a second selection unit which is installed on an upper portion of the first selection unit, and on which sub-options of the various selectable options selected at the first selection unit are indicated, a display unit disposed on an upper portion of the second selection unit, and displaying options selected at the first selection unit and the second selection unit, and a control unit disposed below the dashboard, identifying operations of the first selection unit and the second selection unit so as to control various types of options of the vehicle, and changing indication on the second selection unit and the display unit, in which a sub-option indicated on the second selection unit is changed depending on an option selected at the first selection unit.

Options including a START option, an electric parking brake (EPB) option, an AUDIO option, a MODE SELECT option, a SHIFT LEVER option, and a HEATER option may be indicated on the first selection unit, and the sub-option may be indicated on the second selection unit while being changed depending on the option selected at the first selection unit.

The first selection unit and the second selection unit may be each formed in a circular truncated conical shape, respectively, various selectable options of the first selection unit and sub-options of the second selection unit may each be indicated on side surfaces of the first selection unit and the second selection unit, and a size of an inclination angle of the side surface of the first selection unit may be relatively smaller than a size of an inclination angle of the side surface of the second selection unit for improved visibility.

The first selection unit, the second selection unit, and the display unit may be disposed to form concentric circles coaxially.

Radio-frequency identification (RFID) TAGs may be embedded in the first selection unit and the second selection unit, an RFID reader may be embedded in the control unit, and the control may identify a currently selected option by reading electric waves created at the first selection unit.

One selected option and other non-selected options among the options indicated on the first selection unit and the sub-options indicated on the second selection unit may be indicated using different colors.

The unified electronic shift lever apparatus according to the exemplary embodiment of the present invention may further include a first motor disposed below the dashboard, and having one end engaged with one side of the first selection unit, and a second motor disposed below the dashboard, and having one end connected with one side of the second selection unit, in which the first selection unit or the second selection unit may each be rotatable by the first motor or the second motor, respectively.

The unified electronic shift lever apparatus according to the exemplary embodiment of the present invention may further include a level button disposed on the dashboard, and setting the first motor or the second motor to be operable, a rotation button disposed on the dashboard, and operating either of the first motor or the second motor that is selected by the level button to in turn operate the first selection unit or the second selection unit, and a selection button which is disposed on the dashboard, and configured to select any one option among the various selectable options indicated on the first selection unit and the second selection unit.

The unified electronic shift lever apparatus according to the exemplary embodiment of the present invention may further include a left and right button disposed on the dashboard, and determining rotational directions (a clockwise direction or a counterclockwise direction) of the first motor and the second motor.

The unified electronic shift lever apparatus according to the exemplary embodiment of the present invention may further include a first external gear extended downward from the first selection unit while penetrating the dashboard, and having a hollow space formed at a central portion thereof, a second external gear extended downward from the second selection unit while penetrating the dashboard, inserted into the hollow space of the first external gear, and having a hollow space formed at a central portion of the second external gear, and a column portion extended from the display unit to the control unit while penetrating the dashboard, and inserted into the hollow space of the second external gear, in which the first external gear is engaged with a first rotation gear formed at the one end of the first motor and then rotated, and the second external gear is engaged with a second rotation gear formed at the one end of the second motor and then rotated.

An inner diameter of the first external gear may be relatively greater than an outer diameter of the second external gear, and an inner diameter of the second external gear may be relatively greater than an outer diameter of the column portion.

A downward extended length of the first external gear may be relatively shorter than a downward extended length of the second external gear.

According to the present invention having the aforementioned configuration, various numerous options including gear shift options of a vehicle are disposed in the single unified shift lever, which includes the first selection unit and the second selection unit, in a unifying manner, thereby reducing production costs and a weight of the vehicle.

The driver may perform various functions merely by manipulating comparatively simple buttons such as the level button, the rotation button, the selection button, and the like, thereby remarkably improving operational characteristics in comparison with the related art in which buttons are complicatedly spaced out.

The buttons having various functions are integrated into a single button, such that a button layout of the vehicle is reduced, thereby increasing a space suitable for accommodating a cup holder or various types of items.

The inclination angle of the side surface of the first selection unit is relatively smaller than the inclination angle of the side surface of the second selection unit, such that the first selection unit is nearly horizontally disposed when the driver sees the first selection unit from the top thereof, thereby remarkably improving visibility of the driver.

The driver may select a desired option using the rotation button and the selection button while visually identifying the desired option such that the driver has fun while manipulating the rotation button and the selection button, and all of the functions are integrated into a single configuration such that design inside the vehicle becomes luxurious, thereby improving marketability of the vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
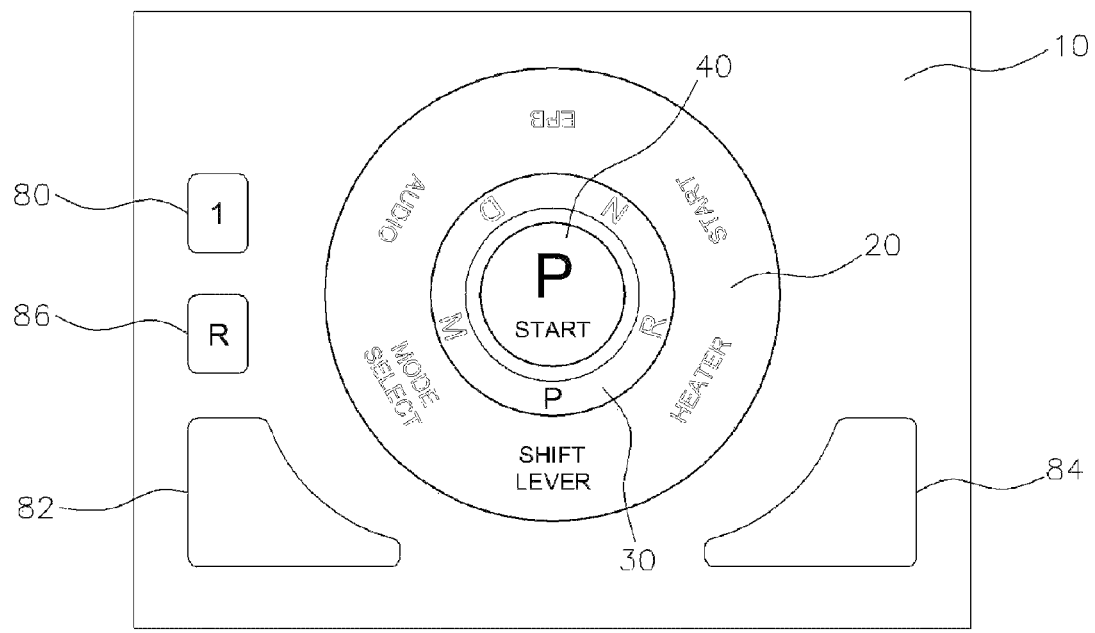
FIG. 1 is a top plan view illustrating an appearance of an exemplary unified electronic shift lever according to the present invention.
Figure 2:
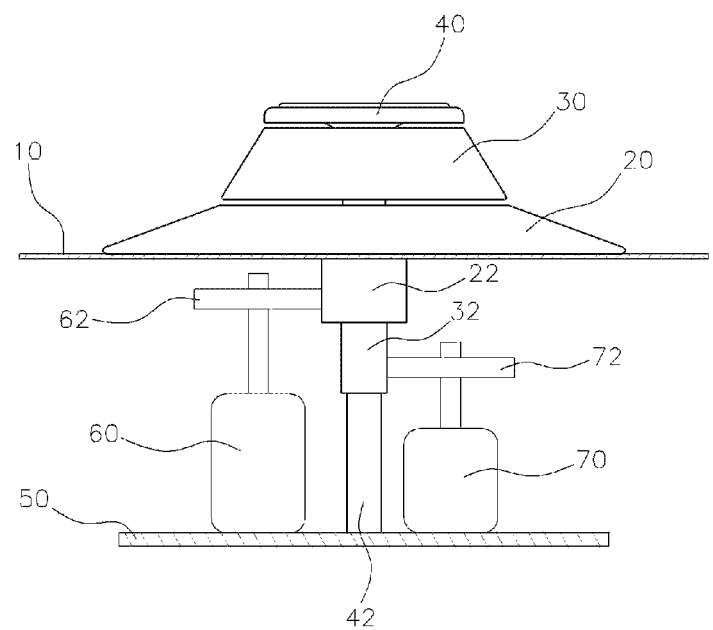
FIG. 2 is a side view illustrating an appearance of the exemplary unified electronic shift lever according to the present invention.

FIG. 1 is a top plan view illustrating an appearance of a unified electronic shift lever according to various embodiments of the present invention, and FIG. 2 is a side view illustrating an appearance of the unified electronic shift lever according to various embodiments of the present invention.

The unified electronic shift lever according to various embodiments of the present invention may include a first selection unit 20 which is installed on a dashboard 10 of a vehicle, and on which various selectable options including a gear shift option of the vehicle are indicated, a second selection unit 30 which is installed on an upper portion of the first selection unit 20, and on which sub-options of the option selected at the first selection unit 20 are indicated, a display unit 40 which is disposed on an upper portion of the second selection unit 30, and displays the options selected at the first selection unit 20 and the second selection unit 30, and a control unit 50 which is disposed below the dashboard 10, identifies operations of the first selection unit 20 and the second selection unit 30 so as to control various options of the vehicle, and changes indication of the second selection unit 30 and the display unit 40, in which the sub-option indicated on the second selection unit 30 is changed depending on the option selected at the first selection unit 20.

The dashboard 10 of the vehicle is a portion which is a partition wall that partitions the interior of the vehicle and an engine room, and includes a center fascia on which an instrument panel having instruments such as a speedometer which display information that is required to drive the vehicle, a steering handle for manipulating a direction of the vehicle, and adjustment buttons for an audio system and an air conditioner are present, and a console surface on which the shift lever of the vehicle is disposed.

The dashboard 10 is made of a soft material such as a urethane material in order to protect an occupant, and mostly formed in a T shape.

The unified electronic shift lever of the present invention, which includes the first selection unit 20, the second selection unit 30, and the display unit 40 that will be described below, may be disposed on the console surface on which the shift lever in the related art was disposed, may be disposed on the center fascia on which various types of buttons in the related art were disposed, and may be disposed in the vicinity of the steering handle of the vehicle in some cases.

The first selection unit 20 on which various selectable options including the gear shift option of the vehicle are indicated is installed on the dashboard 10, the second selection unit 30 on which the sub-options of the option selected at the first selection unit 20 are indicated is installed on the upper portion of the first selection unit 20, and the display unit 40, which displays the options selected at the first selection unit 20 and the second selection unit 30, is disposed on the upper portion of the second selection unit 30.

That is, the first selection unit 20, the second selection unit 30, and the display unit 40 are disposed to form a concentric circle on the basis of the same axis when viewed from the top thereof as illustrated in FIG. 1, and to have an arrangement in which the first selection unit 20, the second selection unit 30, and the display unit 40 are sequentially stacked when viewed from the side thereof as illustrated in FIG. 2.

Examples of a manner of selecting the options indicated on the first selection unit 20 and the second selection unit 30 may include various manners such as a manner in which the first selection unit 20 and the second selection unit 30 are formed as a touch screen such that the driver directly touches the first selection unit 20 and the second selection unit 30, and a manner in which a separate button is provided as will be described below such that the driver selects a desired option by pressing the button.

As illustrated in FIG. 2, the control unit 50 such as a printed circuit board (PCB), which identifies the operations of the first selection unit 20 and the second selection unit 30 so as to control various types of options of the vehicle, and changes the indication of the second selection unit 30 and the display unit 40, is disposed below the dashboard 10.

The control unit 50 serves to receive signals sent from the first selection unit 20 and the second selection unit 30, transmit the signals to an electronic control unit (ECU) and the like of the vehicle, and control overall operations of the unified electronic shift lever according to the present invention.

As illustrated in FIG. 1, a START option, an EPB (electric parking brake) option, an AUDIO option, a MODE SELECT option, a SHIFT LEVER option, a HEATER option, and the like are indicated on the first selection unit 20.

Specifically, regarding the options indicated on the first selection unit 20, the START option is an option for turning on/off an engine of the vehicle, the EPB option is an option for assisting in parking the vehicle on a slope or the like depending on information on a weight of the vehicle and a gradient of a road surface, and the AUDIO option is an option for turning on/off the audio system in the vehicle or adjusting the volume thereof.

The MODE SELECT option is an option for allowing the driver to determine a driving mode depending on preference of the driver, the SHIFT LEVER option is an option for allowing the driver to change the gear shift stage, and the HEATER option is an option for turning on/off a heater in the vehicle or adjusting a temperature in the vehicle.

The sub-options are variably indicated on the second selection unit 30 depending on the option selected at the first selection unit 20.

Specifically, regarding the options indicated on the second selection unit 30, ON and OFF options are indicated on the second selection unit 30 when the START option is selected at the first selection unit 20, ON and OFF options are indicated on the second selection unit 30 when the EPB option is selected at the first selection unit 20, and ON and OFF options, a volume up option, a volume down option, a radio option, a radio channel up option, and a radio channel down option are indicated on the second selection unit 30 when the AUDIO option is selected at the first selection unit 20.

An ECO option, a SPORT option, and a NORMAL option are indicated on the second selection unit 30 when the MODE SELECT option is selected at the first selection unit 20, a P-stage, an R-stage, an N-stage, a D-stage, and an M-stage are indicated on the second selection unit 30 when the SHIFT LEVER option is selected at the first selection unit 20, and an ON option, an OFF option, an option for increasing wind intensity, an option for decreasing wind intensity, an option for increasing a temperature, and an option for decreasing a temperature are indicated on the second selection unit 30 when the HEATER option is selected at the first selection unit 20.

Of course, the options indicated on the first selection unit 20 and the second selection unit 30 may be varied depending on a change in an internal function according to the type of vehicle, a change in a function preferred by the driver, and a change in shapes of the first selection unit 20 and the second selection unit 30.

Radio-frequency identification (RFID) TAGs may be embedded in the first selection unit 20 and the second selection unit 30 so as to communicate with an RFID reader in the control unit 50.

An RFID technology refers to a technology for identifying information at a long distance using electric waves, and includes the RFID TAG and the RFID reader. The RFID TAG includes an antenna and an integrated circuit, and is used in a way that information is recorded in the integrated circuit, and sent to the reader through the antenna.

That is, when the driver or the occupant selects a predetermined option by manipulating the first selection unit 20 and the second selection unit 30, the control unit 50 reads electric waves from the first selection unit 20 and the second selection unit 30, and identifies the selected option.

Therefore, the unified electronic shift lever according to the present invention may perform various types of functions of the vehicle by reading various options in a unifying manner using a comparatively simple structure without having a complicated mechanical device.

As illustrated in FIG. 1, among the options indicated on the first selection unit 20 and the second selection unit 30, the currently selected option and the non-selected option may be indicated using different colors.

That is, the driver or the occupant may identify the current state of the vehicle by viewing letters or figures displayed on the display unit 40, and may identify the current state of the vehicle only by viewing the indication on the first selection unit 20 and the second selection unit 30.

Figure 3:
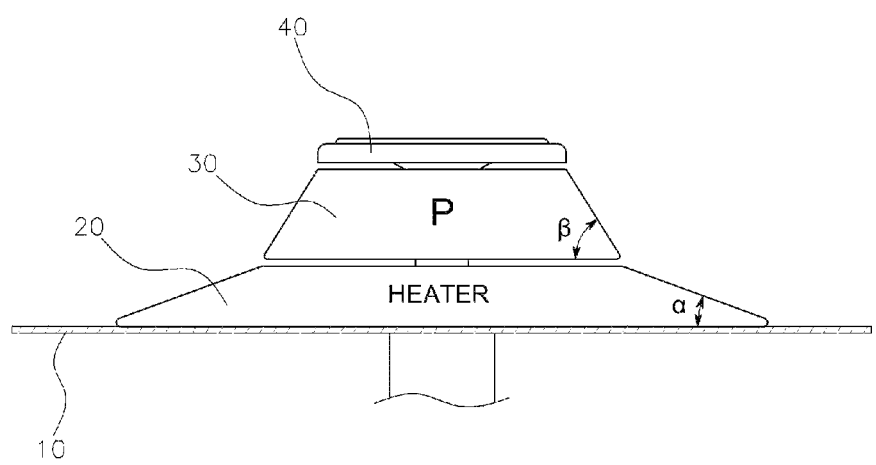
FIG. 3 is an enlarged side view illustrating an enlarged appearance of an upper portion of the exemplary unified electronic shift lever according to the present invention.
Figure 4:
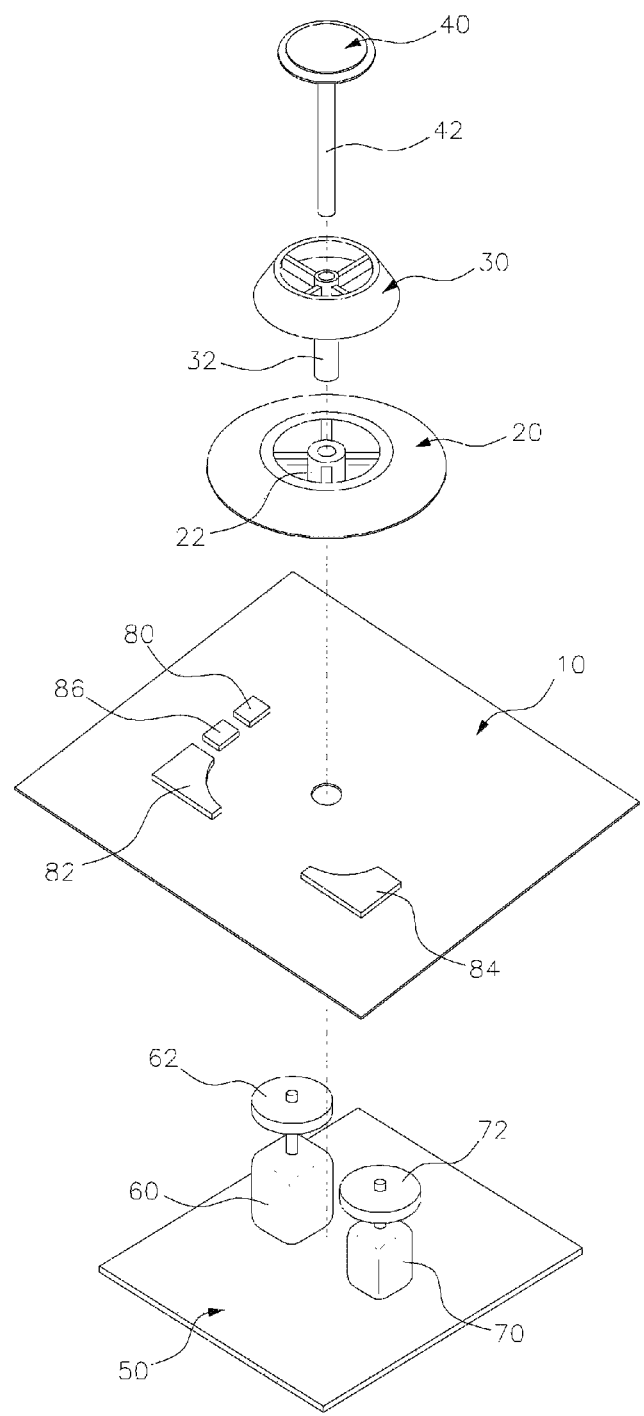
FIG. 4 is an assembled view of the exemplary unified electronic shift lever according to the present invention.

FIG. 3 is an enlarged side view illustrating an enlarged appearance of an upper portion of the unified electronic shift lever according to various embodiments of the present invention, and FIG. 4 is an assembled view of the unified electronic shift lever according to various embodiments of the present invention.

The first selection unit 20 and the second selection unit 30 are formed in a circular conical shape formed by cutting a part including an apex, that is, in a circular truncated conical shape, and various types of options and sub-options thereof may be indicated on side surfaces of the first selection unit 20 and the second selection unit 30, that is, on a side surface of the circular truncated cone.

As illustrated in FIG. 3, a size of an inclination angle α of the side surface of the first selection unit may be relatively smaller than a size of an inclination angle β of the side surface of the second selection unit.

That is, the first selection unit 20 is formed to be overall wider and flatter than the second selection unit 30, and as a result, letters or figures indicated on the first selection unit 20 are nearly horizontally disposed when the driver sees the letters or the figures from the top thereof, thereby improving visibility.

The letters or the figure (P in the illustrated exemplary embodiment) indicated on the second selection unit 30 may be indicated to be relatively greater than the letters or the figures (HEATER in the illustrated exemplary embodiment) indicated on the first selection unit 20, thereby improving visibility of the second selection unit 30.

As illustrated in FIGS. 2 and 4, a first motor 60 and a second motor 70 are disposed below the dashboard 10, the first motor 60 is connected with one side of the first selection unit 20, and the second motor 70 is connected with one side of the second selection unit 30.

The first selection unit 20 and the second selection unit 30 may be rotated by the first motor 60 and the second motor 70, respectively, and by this rotation, the driver may have fun while manipulating the first selection unit 20 and the second selection unit 30, and may clearly identify the currently selected option.

Specifically, a first external gear 22 is extended downward from a lower portion of the first selection unit 20 while penetrating the dashboard 10, a second external gear 32 is extended downward from a lower portion of the second selection unit 30 while penetrating the dashboard 10, and a column portion 42 is extended from a lower portion of the display unit 40 to the control unit 50 while penetrating the dashboard 10.

The first external gear 22 is engaged with a first rotation gear 62 formed at one end of the first motor 60 and then rotated, and the second external gear 32 is engaged with a second rotation gear 72 formed at one end of the second motor 70 and then rotated.

As the first external gear 22 and the second external gear 32 are rotated by the first rotation gear 62 and the second rotation gear 72, the first selection unit 20 and the second selection unit 30 are rotated, and this rotation is operated by various types of buttons that will be described below.

As illustrated in FIG. 4, hollow spaces are formed at central portions of the first external gear 22 and the second external gear 32, respectively, and the first external gear 22 and the second external gear 32 are assembled in a manner in which the second external gear 32 is inserted into the hollow space of the first external gear 22, and the column portion 42 is inserted into the hollow space of the second external gear 32.

That is, the first selection unit 20, the second selection unit 30, and the display unit 40 are disposed to form a concentric circle on the basis of the column portion 42 when viewed from the top thereof, a size of an upper surface of the first selection unit 20 may be identical to a size of a lower surface of the second selection unit 30, and a size of an upper surface of the second selection unit 30 may be identical to a size of a lower surface of the display unit 40.

As illustrated in FIGS. 1 and 4, on the dashboard 10, there may be disposed a level button 80 which sets the first motor 60 or the second motor 70 to be operable, a rotation button 82 which rotates the first motor 60 or the second motor 70, and a selection button 84 which is configured to select any one option among the options indicated on the first selection unit 20 and the second selection unit 30.

A left and right button 86, which determines rotational directions (a clockwise direction or a counterclockwise direction) of the first motor 60 and the second motor 70, may be further included on the dashboard 10.

The level button 80, the rotation button 82, the selection button 84, and the left and right button 86 may be directly connected with the first motor 60 and the second motor 70 using wires or the like, or may be indirectly connected with the first motor 60 and the second motor 70 using a method of sending and receiving electric waves.

The driver first determines the first selection unit 20 or the second selection unit 30 that is desired to be selected, using the level button 80, rotates the first selection unit 20 or the second selection unit 30 in the clockwise direction or the counterclockwise direction (that is determined by the left and right button 86) using the rotation button 82, and thereafter, selects a desired option using the selection button 84.

As described above, it is necessary to separately operate the first selection unit 20 and the second selection unit 30, and thus, predetermined gaps are required between the first external gear 22, the second external gear 32, and the column portion 42.

Therefore, an inner diameter of the first external gear 22 may be relatively greater than an outer diameter of the second external gear 32, and an inner diameter of the second external gear 32 may be relatively greater than an outer diameter of the column portion 42.

A downward extended length of the first external gear 22 may be relatively shorter than a downward extended length of the second external gear 32 so that the second external gear 32 may protrude to the outside of the first external gear 22.

That is, the first external gear 22 and the second external gear 32 do not interfere with each other, and may be rotated independently of each other, and depending on the driver's selection, the first motor 60 may rotate only the first external gear 22, and the second motor 70 may rotate only the second external gear 32.

An operational process of the unified electronic shift lever according to the exemplary embodiment of the present invention will be described below.

Figure 5:
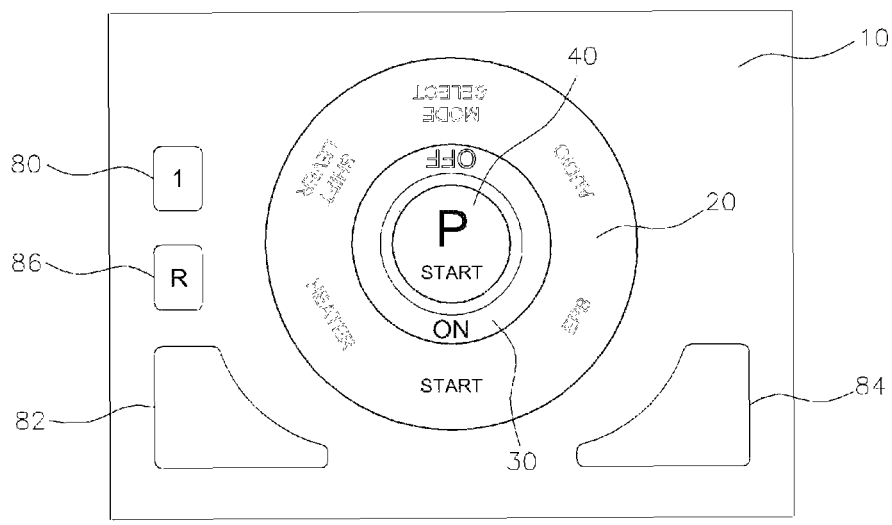
FIG. 5 is a top plan view illustrating appearances of a first selection unit and a second selection unit in the exemplary unified electronic shift lever according to the present invention.
Figure 6:
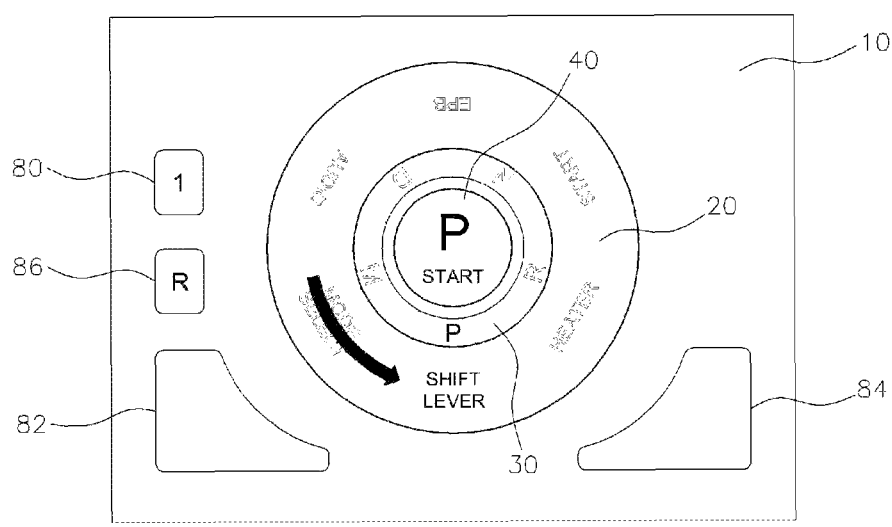
FIG. 6 is a top plan view illustrating appearances of a first selection unit and a second selection unit an exemplary unified electronic shift lever according to the present invention.
Figure 7:
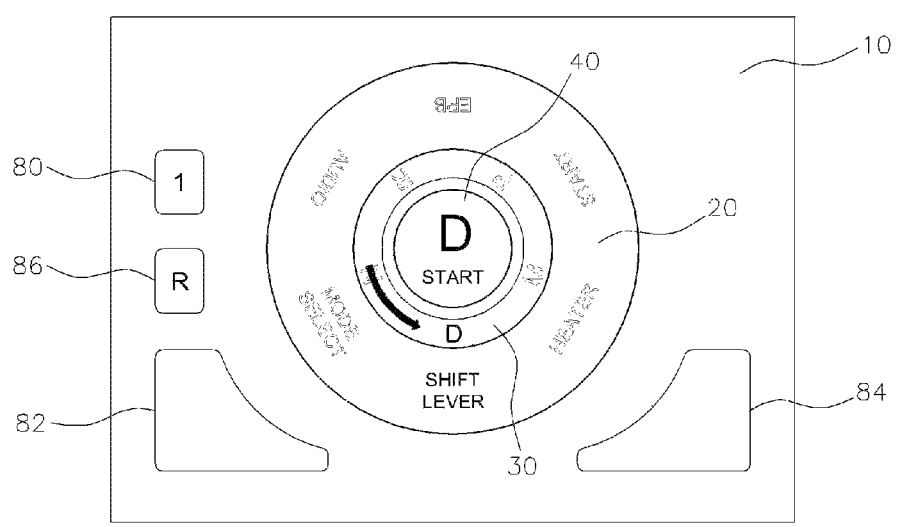
FIG. 7 is a top plan view illustrating appearances of a first selection unit and a second selection unit in an exemplary unified electronic shift lever according to the present invention.

FIG. 5 is a top plan view illustrating appearances of the first selection unit 20 and the second selection unit 30 according to various embodiments of the present invention, FIG. 6 is a top plan view illustrating appearances of a first selection unit 20 and a second selection unit 30 according to various embodiments of the present invention, and FIG. 7 is a top plan view illustrating appearances of a first selection unit 20 and a second selection unit 30 according to various embodiments of the present invention.

As illustrated in FIG. 5, when the driver sits in the driver's seat, the driver selects the START option at the first selection unit 20 using the selection button 84, and starts the engine of the vehicle by selecting the ON option at the second selection unit 30.

Next, as illustrated in FIG. 6, in order to change the gear shift stage, the driver presses the rotation button 82 and the selection button 84 so as to select the SHIFT LEVER option at the first selection unit 20 in a state in which the driver determines the first selection unit 20 using the level button 80 and the right side (counterclockwise direction) using the left and right button 86, and in this case, the indication on the second selection unit 30 is changed to the P-stage, the R-stage, the N-stage, the D-stage, and the M-stage.

Finally, as illustrated in FIG. 7, when the driver selects the D-stage option at the second selection unit 30 by pressing the rotation button 82 and the selection button 84 in a state in which the driver selects the second selection unit 30 by pressing the level button 80, the vehicle travels after the gear shift stage is changed to the D-stage.

In this case, the display unit 40 displays the currently selected option, that is, the D-stage among the gear shift stages of the vehicle, and the driver may identify the currently selected option at a look by confirming the display unit 40.

Other options, which have been described above, are selected in the similar manner, the driver may select a desired option by properly adjusting the level button 80, the left and right button 86, the rotation button 82, and the selection button 84.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A unified electronic shift lever apparatus comprising:
   a first selection unit installed on a dashboard of a vehicle, and on which selectable options including a gear shift option of the vehicle are indicated;
   a second selection unit installed on an upper portion of the first selection unit, and on which sub-options of the selectable options selected at the first selection unit are indicated;
   a display unit disposed on an upper portion of the second selection unit, and displaying options selected at the first selection unit and the second selection unit; and
   a control unit disposed below the dashboard, identifying operations of the first selection unit and the second selection unit to control various types of options of the vehicle, and changing indication on the second selection unit and the display unit,
   wherein a sub-option indicated on the second selection unit is changed depending on an option selected at the first selection unit.

2. The unified electronic shift lever apparatus of claim 1, wherein options including a START option, an electric parking brake (EPB) option, an AUDIO option, a MODE SELECT option, a SHIFT LEVER option, and a HEATER option are indicated on the first selection unit, and the sub-option is indicated on the second selection unit while being changed depending on the option selected at the first selection unit.

3. The unified electronic shift lever apparatus of claim 1, wherein the first selection unit and the second selection unit are each formed in a circular truncated conical shape,
   wherein the selectable options of the first selection unit and the sub-options of the second selection unit are each indicated on side surfaces of the first selection unit and the second selection unit respectively, and
   wherein a size of an inclination angle of the side surface of the first selection unit is relatively smaller than a size of an inclination angle of the side surface of the second selection unit for improved visibility.

4. The unified electronic shift lever apparatus of claim 1, wherein the first selection unit, the second selection unit, and the display unit are disposed to form concentric circles coaxially.

5. The unified electronic shift lever apparatus of claim 1, wherein radio-frequency identification (RFID) TAGs are embedded in the first selection unit and the second selection unit, an RFID reader is embedded in the control unit, and the control unit identifies a currently selected option by reading electric waves created at the first selection unit and the second selection unit.

6. The unified electronic shift lever apparatus of claim 1, wherein one selected option and other non-selected options among the options indicated on the first selection unit and the sub-options indicated on the second selection unit are indicated using different colors.

7. The unified electronic shift lever apparatus of claim 1, further comprising:
   a first motor disposed below the dashboard, and having one end engaged with one side of the first selection unit; and
   a second motor disposed below the dashboard, and having one end engaged with one side of the second selection unit, wherein the first selection unit or the second selection unit are each rotatable by the first motor or the second motor, respectively.

8. The unified electronic shift lever apparatus of claim 7, further comprising:
   a level button disposed on the dashboard, and setting the first motor or the second motor to be operable;
   a rotation button disposed on the dashboard, and operating either of the first motor or the second motor that is selected by the level button to in turn operate the first selection unit or the second selection unit; and
   a selection button disposed on the dashboard, and configured to select any one option among the selectable options indicated on the first selection unit and the second selection unit.

9. The unified electronic shift lever apparatus of claim 8, further comprising:
   a left and right button disposed on the dashboard, and determining rotational directions (a clockwise direction or a counterclockwise direction) of the first motor and the second motor.

10. The unified electronic shift lever apparatus of claim 7, further comprising:
    a first external gear extended downward from the first selection unit while penetrating the dashboard, and having a hollow space formed at a central portion of the first external gear;
    a second external gear extended downward from the second selection unit while penetrating the dashboard, inserted into the hollow space of the first external gear, and having a hollow space formed at a central portion of the second external gear; and
    a column portion extended from the display unit to the control unit while penetrating the dashboard, and inserted into the hollow space of the second external gear, wherein the first external gear is engaged with a first rotation gear formed at the one end of the first motor and then rotated, and the second external gear is engaged with a second rotation gear formed at the one end of the second motor and then rotated.

11. The unified electronic shift lever apparatus of claim 10, wherein an inner diameter of the first external gear is relatively greater than an outer diameter of the second external gear, and an inner diameter of the second external gear is relatively greater than an outer diameter of the column portion.

12. The unified electronic shift lever apparatus of claim 10, wherein a downward extended length of the first external gear is relatively shorter than a downward extended length of the second external gear.

* * * * *